United States Patent [19]

Schraven et al.

[11] Patent Number: 5,397,528
[45] Date of Patent: Mar. 14, 1995

[54] METHOD OF CLOSING A MOULD BEFORE AT LEAST PARTLY FILLING A CAVITY OF THIS MOULD WITH A SOLIDIFIABLE LIQUID

[75] Inventors: Josephus J. M. Schraven; Marinus B. J. De Kruijff, both of Nijmegen, Netherlands

[73] Assignee: U.S. Philips Corporation, New York, N.Y.

[21] Appl. No.: 96,573

[22] Filed: Jul. 22, 1993

Related U.S. Application Data

[62] Division of Ser. No. 710,264, Jun. 4, 1991, Pat. No. 5,252,053.

[30] Foreign Application Priority Data

Feb. 26, 1991 [NL] Netherlands ......................... 9100338

[51] Int. Cl.⁶ ............................................. B29C 45/64
[52] U.S. Cl. .................... 264/328.1; 425/589
[58] Field of Search ............. 264/328.1, 272.11, 328.7; 100/258 A, 258 R, 270; 425/150, 190, 117, 127, 233, 406, 408, 409, 451.2, 451.7, 451.9, 589, 590, 595, 129.1

[56] References Cited

FOREIGN PATENT DOCUMENTS 62-87318  4/1987  Japan .
1184909  3/1970  United Kingdom .
1402806  8/1975  United Kingdom .

*Primary Examiner*—Jill L. Heitbrink
*Attorney, Agent, or Firm*—Ernestine C. Bartlett

[57] ABSTRACT

A method of closing a mold and a press therefore, whereby a first mold part is moved towards a second mold part by a first relatively large displacement via a mechanical non-fluid drive. The mold parts are then pressed against one another by a fluid system including a pneumatically driven hydraulic system to provide relative high mold pressures. Drive and follower pins are selectively coupled to the hydraulic system by a carousel for selectively coupling a mold part to the hydraulic system during the pressing portion of the cycle. The method and press are particularly suitable for encapsulating electrical components.

3 Claims, 6 Drawing Sheets

METHOD OF CLOSING A MOULD BEFORE AT LEAST PARTLY FILLING A CAVITY OF THIS MOULD WITH A SOLIDIFIABLE LIQUID

This is a division of application Ser. No. 07/710,264, filed Jun. 4, 1991, now U.S. Pat. No. 5,252,053.

FIELD OF THE INVENTION

The invention relates to a method of closing a mold before at least partly filling a mold cavity with a solidifiable liquid, whereby a first mold part is moved towards a second mold part parallel to a central axis and pressed against the second mold part by a hydraulic system, and subsequently a mold cavity enclosed by the mold parts is filled with the solidifiable liquid. The invention also relates to a press suitable for carrying out this method. The invention also relates to a mold part suitable for use in the press.

BACKGROUND OF THE INVENTION

A method of the kind described in the opening paragraph and a press for carrying out this method are known from the German Patent 838.438 which corresponds to U.S. Pat. No. 2,657,429 In a first phase of this known method, a first mold part is moved from an initial position parallel to a central axis to a second mold part by means of a liquid medium which is pumped into a cylinder under a first pressure (for example, 35 at), upon which in a second phase the same liquid medium is brought under a second, increased pressure (for example, 200 at) in order to press the mold parts together. After the solidifiable liquid placed in the mold has cured or solidified, the first mold part is returned to the initial position by purely hydraulic means. A disadvantage of the known method and press is that the quantity of hydraulic liquid medium which is displaced for opening and closing the mold parts is comparatively great, so that a comparatively large hydraulic pump is required with an associated cooling device for cooling the liquid medium. The total quantity of energy required for opening and closing the mold parts as a result is also comparatively great.

SUMMARY OF THE INVENTION

The invention has for its object to provide a method by which the mold parts can be moved towards one another and pressed against one another with a comparatively small quantity of hydraulic liquid medium having to be pumped.

The method according to the invention is for this purpose characterized in that a primary displacement parallel to the central axis in the direction of the second mold part is carried out by the first mold part by means of a mechanical drive in a first displacement range, and subsequently in an adjoining second displacement range a secondary displacement parallel to the central axis in the direction of the second mold part is carried out purely by means of a pressurized fluid operated system via actuators which after the primary displacement of the first mold part are moved from an idle position to an operational position in which the mold parts are kept pressed against one another by the actuators after the secondary displacement has been completed by the actuators. The fluid operated system is suitable for exerting a comparatively great force during pressing together of the mold parts. A mechanical drive on the other hand is particularly suitable for moving the mold parts. Thus a mold part may be displaced over a comparatively large distance with a comparatively small force thereby. The term "mechanical drive" is here understood to mean any direct drive of the first mold part in which no use is made of a fluid medium for the transfer of forces during the displacement in the first displacement range. During the primary displacement, the mold parts are moved up to a small distance from one another by the mechanical drive. The quantity of hydraulic liquid medium to be pumped in the method according to the invention is comparatively small and is used during the secondary displacement for displacing the first mold part over the very small distance which causes the first mold part to lie against the second mold part and for pressing together of the mold parts via the actuators.

The invention also has for its object to provide a press with which the disadvantage of the known press is counteracted. According to the invention, therefore, the press suitable for carrying out the method is characterized in that the press is provided with a mechanical drive by means of which the first mold part can be displaced parallel to the central axis and with a number of follower pins which cooperate with the first mold part and whose centerline extend parallel to the central axis and which can be coupled to a pressurized fluid operated system by means of a number of drive pins arranged between the follower pins and the fluid operated system and functioning as actuators, which drive pins are collectively rotatable about the central axis for alignment of the centerlines of the follower and drive pins. At the start of the primary displacement, the drive pins are in the idle position and the follower pins are situated between the drive pins. After the primary displacement, the drive pins are collectively rotated about the central axis in order to align the centerlines of the follower and drive pins. The drive pins are then in the operational position. The fluid operated system then exerts a force on the drive pins so that the drive pins are displaced during the secondary displacement, whereby the follower pins are displaced and the first mold part is pressed against the second mold part.

An embodiment of the press according to the invention is characterized in that the follower pins have their bearings in a slide which is displaceable by means of the mechanical drive, while the follower pins can be coupled to the fluid operated system at one side of the slide and cooperate with the first mold part at another side of the slide. The result of this is that the mechanical drive is not loaded when the mold parts are pressed against one another by means of the fluid system. Another advantage is that the mold parts can be easily exchanged upon the switch-over to a different product to be formed in the mold cavity, while the slide and the follower pins supported in the slide need not be removed from the press.

A further embodiment of the press according to the invention is characterized in that the follower pins are displaceable relative to one another and that the first mold part can be tilted about a pivot axis which is transverse to the central axis. As a result, the first mold part is pressed against the second mold part with forces evenly distributed over the mold part.

Another embodiment of the press according to the invention is characterized in that the press is provided with at least a stop pin which is situated between two follower pins and whose centerline extends parallel to the central axis. The stop pin determines in a simple manner a change-over position of the first mold part in which the product formed in the mold cavity can be removed. The stop pin in this change-over position lies against the drive pin which has been brought into a position intermediate between the idle position and the operational position.

A yet further embodiment of the press according to the invention is characterized in that the drive pins have their bearings in a turret which is rotatable about the central axis. The result is that the drive pins are supported and rotated about the central axis in a simple manner.

A still further embodiment of a press according to the invention is characterized in that the turret is provided with a ring gear which is in engagement with a pinnion and whose centerline coincides with the central axis. Such a turret drive is easy to manufacture and comparatively cheap to purchase and maintain.

A yet further embodiment of the press according to the invention is characterized in that the mechanical drive comprises a threaded spindle and a nut which is displaceable over this threaded spindle, the nut being coupled to the first mold part. Such a mechanical drive is particularly suitable for converting a rotary movement of, for example, an electric motor into a translatory movement, which is performed by the first mold part.

A still different embodiment of the press according to the invention is characterized in that a side of the first mold part facing away from the second mold part is provided with ribs which are situated opposite faces of the first mold part which can be pressed against the second mold part. In such a mold part, the compression force supplied by the fluid system of the press is transmitted via the ribs to the faces which can be pressed against the second mold part. A better transfer of forces takes place by this than in the known press, in which the side facing away from the second mold part is entirely flat. The second mold part may also be provided with such ribs.

BRIEF DESCRIPTION OF THE DRAWING

The invention is explained in more detail with reference to the drawing, in which FIGS. 1, 2 and 3 diagrammatically show a press according to an embodiment of the invention suitable for carrying out the method according to the invention, in which.

DESCRIPTION OF THE PREFERRED EMBODIMENT

Figure 1:
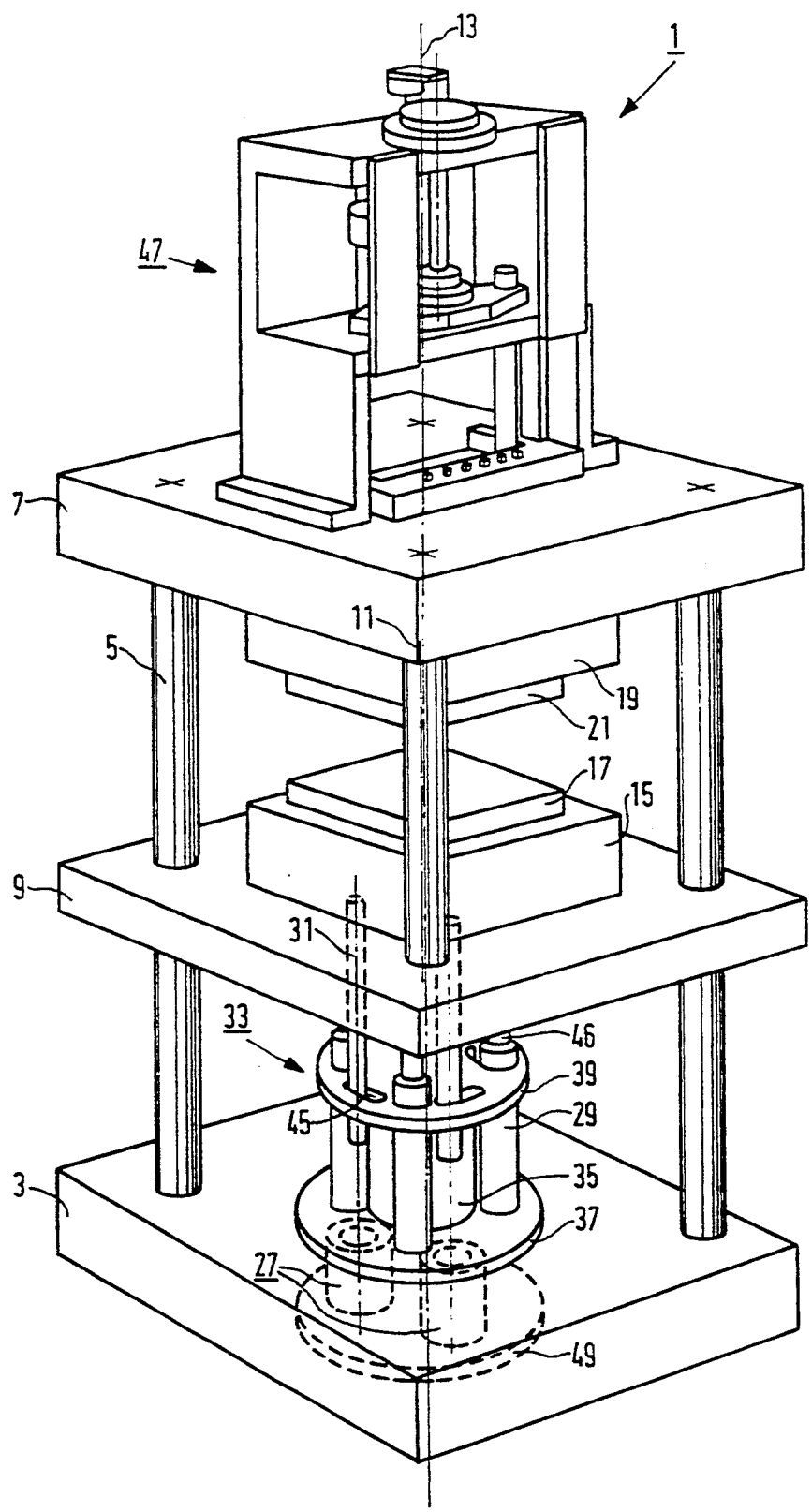
FIG. 1 shows the press during a first displacement range.

Corresponding parts have been given the same reference numerals in the various Figures.

Figure 2:
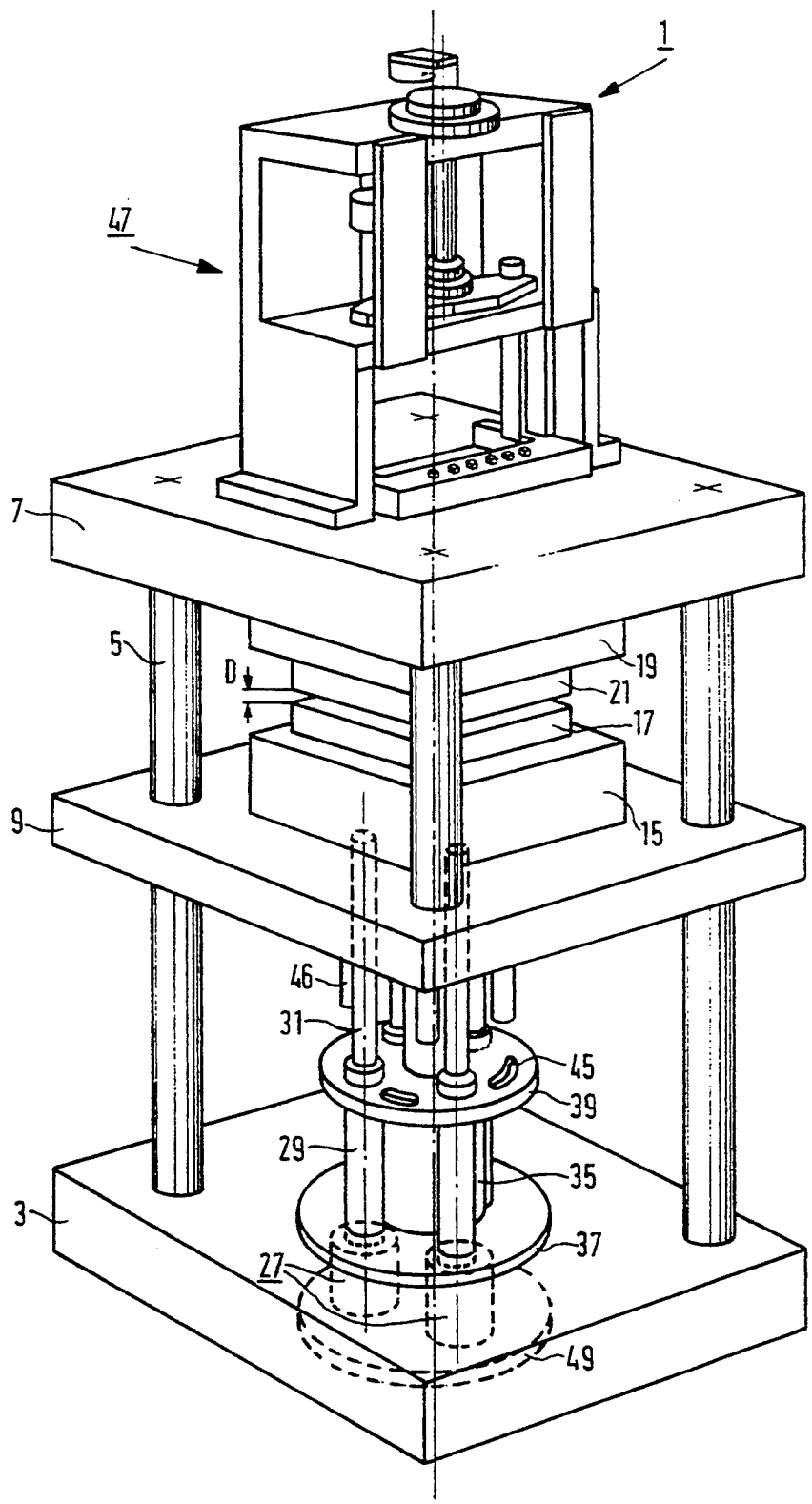
FIG. 2 shows the press during the second displacement range, a actuators being moved into an operational position.
Figure 3:
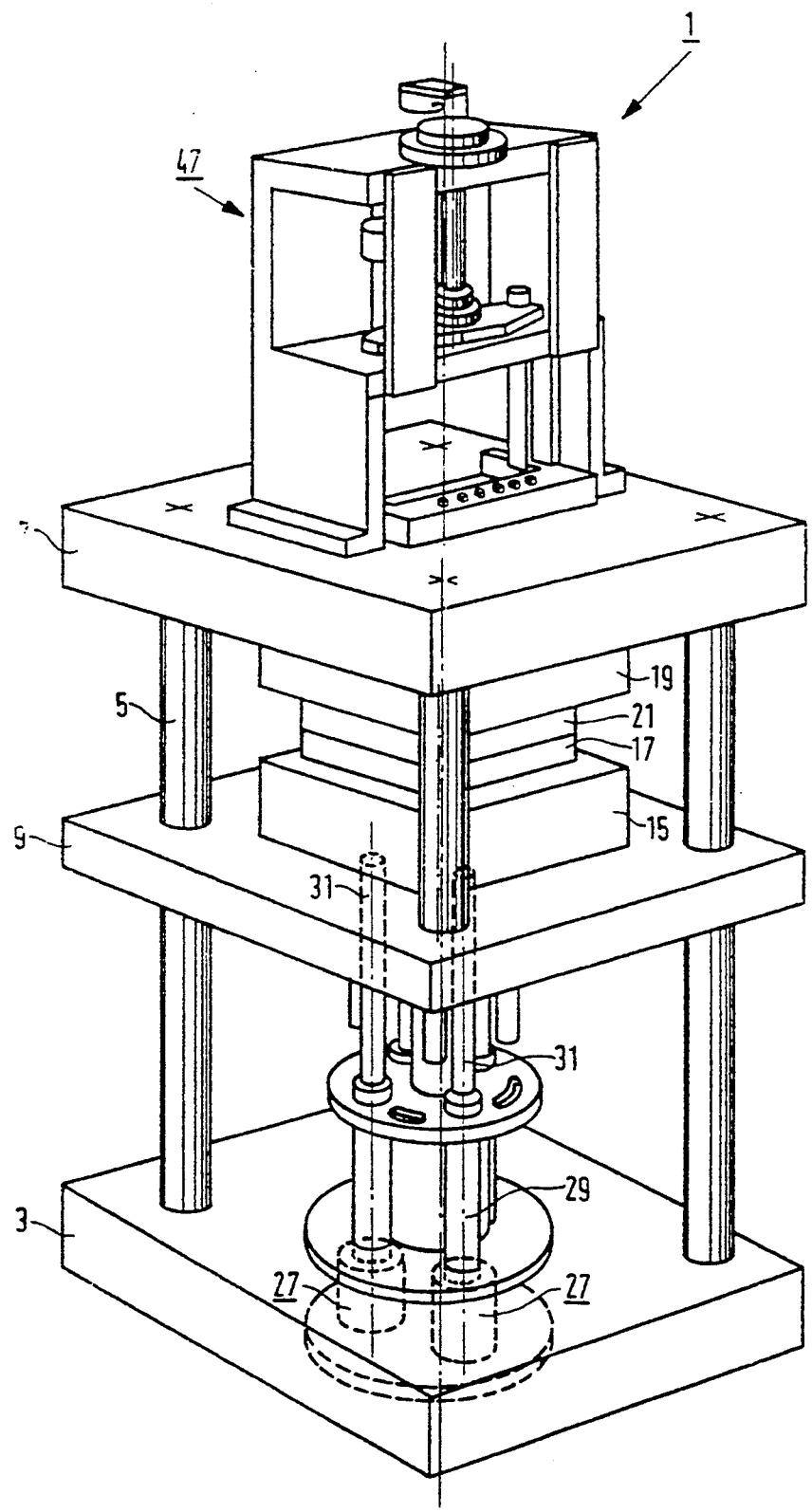
FIG. 3 shows the press while the two mold parts are pressed against one another.

The FIGS. 1, 2 and 3 diagrammatically show in various phases a press 1 according to the invention suitable for carrying out the method according to one embodiment of the invention. The press 1 is provided with a base plate 3 and an upper plate 7 which is connected to the base plate 3 by means of four columns 5. One column of the three columns 5 shown is represented in part only for the sake of clarity (the fourth column is hidden). The columns 5 also serve as guides for a plate-shaped slide 9 which is movable along a central axis 13 which extends parallel to and central with respect to the centerlines 11 of the columns 5. The slide 9 is provided with a first support block 15 and a first mold part 17, while the upper plate 7 is provided with a second support block 19 and a second mold part 21, which together with the first mold part 17 encloses three mold cavities 22 (see FIGS. 3 and 6). The shape of the mold cavities 22 depends on the products to be formed. The slide 9 can be moved along the columns 5 by means of a mechanical drive which comprises a threaded spindle 23 and a nut 25 (FIG. 4) which can be moved along the threaded spindle 23 and is connected to the slide 9. The mechanical drive will be explained in more detail with reference to FIG. 4. The base plate 3 is provided with a pressurized fluid operated system comprising a combined pneumatic and hydraulic system 27 (only a portion of which is shown) which will also be explained with reference to FIG. 4. Between the pneumatic hydraulic system 27 and the bottom of the slide 9 are positioned four drive pins 29 which function as actuators and which, after alignment, can exert a pressure force on four follower pins 31 which are slidably supported in the slide 9. The follower pins 31 bear on the first support block 15 above the slide 9. The press 1 has a turret 33 which can rotate about the central axis 13 and which comprises a bushing 35 in which the threaded spindle 23 is arranged and two discs 37, 39 fastened to the bushing 35 and providing the bearings for the drive pins 29 with sliding possibility. The disc 37 is provided with a ring gear 41 at its circumference which cooperates with a pinion 43 which is coupled to an electric motor 44 (see FIG. 5) via a shaft 42. In the position of the turret 33 shown in FIG. 1, the drive pins 29 are in an idle position. The first mold part 17 is at some distance from the second mold part 21 since the slide 9 has been moved in the direction toward the base plate 3 by means of the mechanical drive (described below in connection with FIGS. 4 and 5) until the stop pins 46 connected to the slide bear with their bottom ends on the upper ends of the drive pins 29. The follower pins 31 project through openings 45 in the disc 39. To move the mold parts 17, 21 against one another, the slide 9 is moved (by a mechanical drive to be described) in connection with FIGS. 4 and 5 below in the direction toward the second mold part 21 in a first displacement range until the bottom ends of the follower pins 31 lie in a plane which, seen from the base plate 3, is higher than a plane in which the upper ends of the drive pins 29 are sinted. The first mold part 17 is then at a small distance D (FIG. 2) from the second mold part 21. The distance D between the mold parts 17, 21 may be equal to 0 mm if the first mold part 17 is moved against the second mold part 21 by the mechanical drive. The position now occupied by the mold parts 17, 21 corresponds to the end of the primary displacement of the slide 9.

In this position of the slide 9 it is possible to rotate the turret 33 until the centerlines of the drive pins 29 are aligned in relation to the centerlines of the follower pins 31. The drive pins 29 are then in the operational position (see FIG. 2). In a second displacement range, the combined pneumatic hydraulic system 27 exerts an equal force on each of the drive pins 29, so that the drive pins 29 are moved in the direction toward the second mold part 21 until the upper ends of the drive pins 29 and the lower ends of the follower pins 31 lie against one another and exert a force on the follower pins 31 which are moved through the slide 9. A force is thereby exerted on the first support block 15 which is moved in the direction toward the second mold part 21 in the second displacement range until the mold part 17 connected to the support block 15 lies against the second mold part 21 (see FIG. 3). The combined pneumatic hydraulic system presses the first mold part 17 against the second mold part 21 via the drive pins 29, the follower pins 31, and the first support block 15. A solidifiable liquid is then introduced into the mold cavity, for example, by means of a diagrammatically shown multiplunger device of a kind as described in, for example, U.S. Pat No. 4,723,899 incorporated by reference herein or German Patent 3336173 which corresponds to U.S. Pat. No. 4,632,653 and which patents are incorporated by reference herein which illustrate encapsulation of semiconductor chips. As a result, the term herein "filling of the mold cavity" includes at least partly filling the cavity with a solidifiable liquid since the remainder of the cavity is occupied by the component being encapsulated. The solidifiable liquid may be a thermosetting or thermoplastic, usually electrically insulating synthetic material which is introduced into the mold cavity in liquid form and then cured or solidified. After filling of the mold cavity, the pressure of the pneumatic hydraulic system 27 is set for zero $N/m^2$, the turret 33 is turned into the idle position, and the slide 9 is moved in the direction toward the base plate 3, upon which the formed product can be removed from the mold cavity and the press 1 is ready for a new cycle. For the exchange of the mold parts, the turret 33 is turned to a position in which both the follower pins 31 and the stop pins 46 can enter the openings 45 of the disc 39, and the slide 9 may be further moved in the direction toward the base plate 3.

Figure 4:
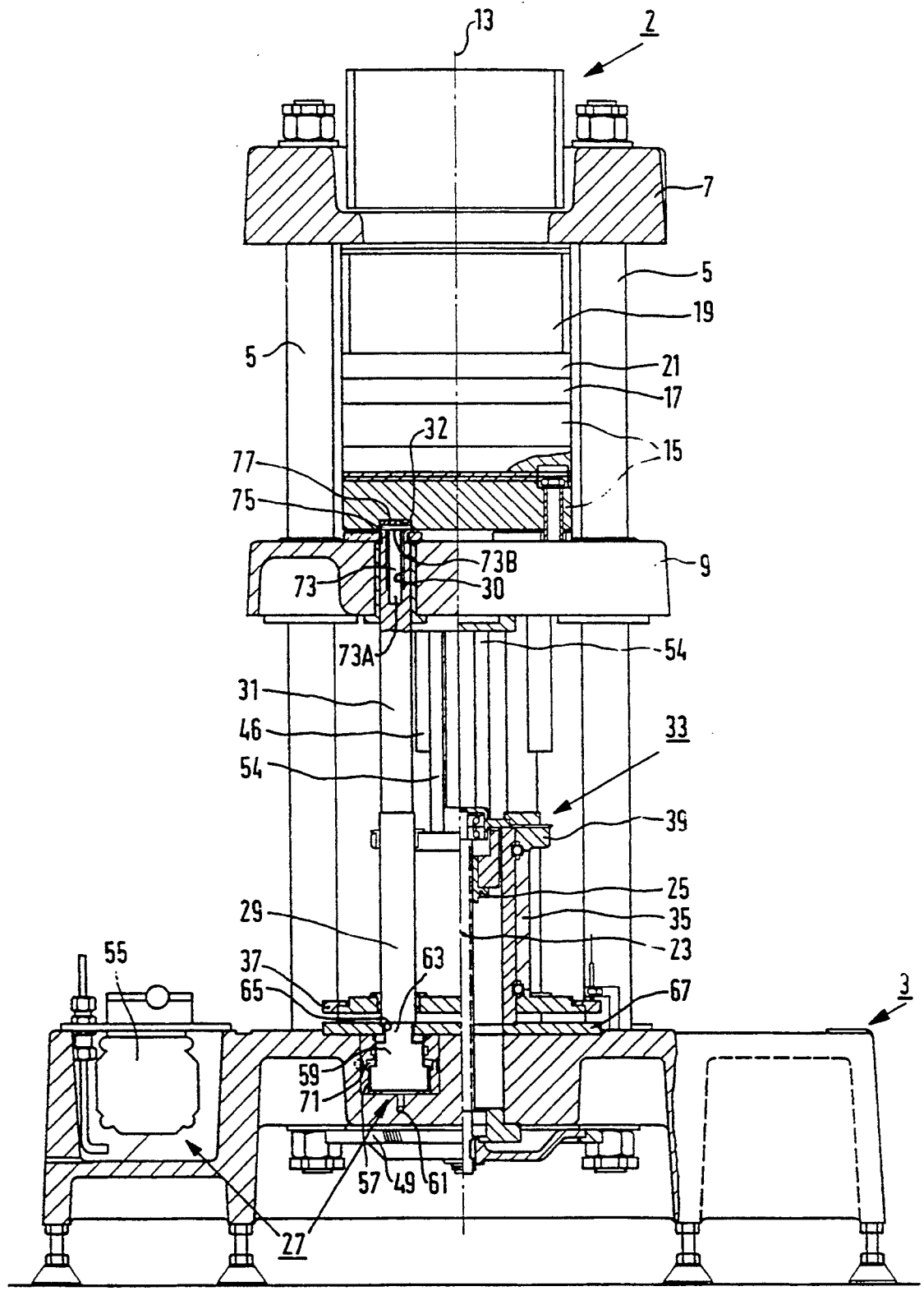
FIG. 4 shows partly in front elevation and partly in cross-section a press suitable for carrying out the method according to the invention.
Figure 5:
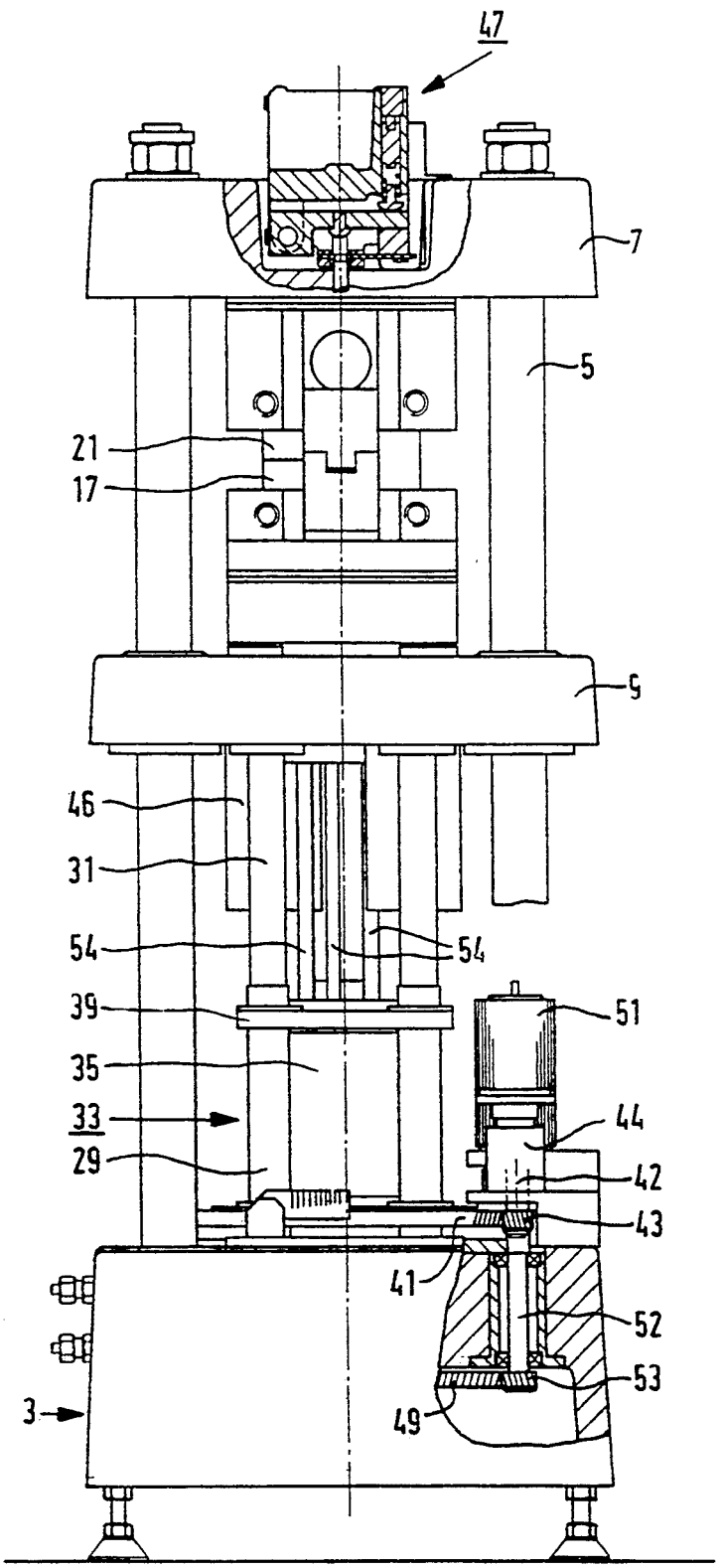
FIG. 5 shows a side elevation of the press of FIG. 4.

FIGS. 4 and 5 show a press 2 of which the operational principle corresponds to that of the press 1 diagrammatically shown in FIGS. 1, 2 and 3.

The mechanical drive of the press 2 comprises a threaded spindle 23 to which a gear 49 is fixed. The gear 49 is driven by a pinnion 53 coupled to an electric motor 51 via a shaft 52. The mechanical drive further comprises a nut 25 which is connected to the slide 9 via coupling rods 54. When the threaded spindle 23 rotates, the nut 25 performs a translation parallel to the central axis 13 in the upward or downward direction.

The pneumatic-hydraulic system 27 comprises a pneumatic pump 55, a transmission mechanism (not shown), a set of pneumatically driven pistons (not shown) and four hydraulically driven pistons 59 which move in cylinder 57. Each hydraulic piston 59 has a corresponding pneumatic piston. The pump 55 applies air pressure of comparatively low value (for example, $3.5 \times 10^5$ $N/M^2$) against each of the pneumatically driven pistons (not shown), each piston having an effective piston surface area A transverse the piston displacement direction. A hydraulic plunger (not shown) is fastened to each of the pneumatic pistons and has an effective cross-sectional surface area B transverse the piston displacement direction, the plunger being in contact with a liquid medium, for example, oil which is in fluid communication with openings 61. The plunger effective transverse surface area B is smaller than the pneumatic piston transverse area A by a factor X, so that the hydraulic pressure exerted by the plunger is greater than the air pressure driving the pneumatic piston by the same factor X. In this way it is possible to apply oil under a high pressure to the pistons 59 via connection openings 61 by means of the pneumatic pump 55 and the pneumatic pistons so as to realize a compression force of 150.000N for each cylinder 57. The pistons 59 each have a portion 63 of reduced diameter which can be moved through an opening 65 in a cover plate 67 of the base plate 3. During rotation of the turret 33, the drive pins 29 slide over the cover plate 67. The diameter of the drive pins 29 is greater than the diameter of the openings 65, so that the drive pins 29 cannot pass through the openings 65. In the second displacement range and during pressing, the portions 63 of reduced diameter of the pistons 59 press against the drive pins 29. The stroke of each piston 59 is approximately 5 mm and is determined by the distance D between the first and second mold parts 17, 21, the distance between the lower ends of the follower pins 31 and the upper ends of the drive pins 29, which is approximately 1–2 mm, and the distance between the lower ends of the drive pins and the ends of the portions 63 of reduced diameter, which is also 1–2 mm. To strip the pistons 59 from the drive pins after pressing, the oil pressure in opening 61 is reduced to zero $N/m^2$ and air pressure (for example, $3.5 \times 10^5$ $N/m^2$) is applied to chambers 71 of the cylinders 57 via ducts (not shown) to drive pistons 59 toward the bottom of the drawing figure.

Each follower pin 31 at its upper end is provided with a bore 30 in which an auxiliary peg 73 is located, which is connected at one side 73A to the follower pin 31 and at another side 73B carries a circular support plate 75 which bears on the slide 9 and by means of which the follower pin 31 is suspended from the slide 9. Between the side 73A and the side 73B, the diameter of the bore 30 is greater than the diameter of the auxiliary peg 73, and the auxiliary peg is capable of bending under mechanical load. The circular support plates 75 support hardened plates 77 which are present in recesses 32 of the first support block 15.

When the first mold part 17 and the second mold part 21 are pressed against one another, surfaces of the first mold part 17 are pressed against surfaces of the second mold part 21. In practice, owing to tolerances, not all surfaces of the first mold part 17 will always hit against the surfaces of the second mold part 21 at the same moment. If the mold part 17 can only be moved parallel to the central axis 13, the result will be that a minimum required clamping force will be applied to only a few surfaces of the mold parts. This results in that plastic mold material will creep between surfaces of the two mold parts during pressing, since these are insufficiently pressed against one another. To prevent this, the press 2 is provided with a "floating" first mold part 17. This means that the mold part 17 is movable not only parallel to the central axis 13, but is also tiltable about a pivot axis transverse to the central axis 13. The moment the first mold part 17 is already locally in contact with the other mold part 21 via a first follower pin 31 with the maximum force F supplied by the pneumatic hydraulic system 27, the other follower pins 31 will try to displace the support block 15 and the first mold part 17 in the direction of the second mold part 21 until the force by which each of the follower pins 31 presses is equal to the force F. The support block 15 and the first mold part 17 as a result will tilt about the pivot axis until all follower pins 31 press against the first mold part 17 via the support block 15 with the same force F. This is possible because the follower pins 31 can be moved independently of one another and because the auxiliary pegs 73 are arranged in the follower pins 31 with bending capability, so that the first support block 15 which rests on the support plates 75 is tiltable about the pivot axis.

Figure 6:
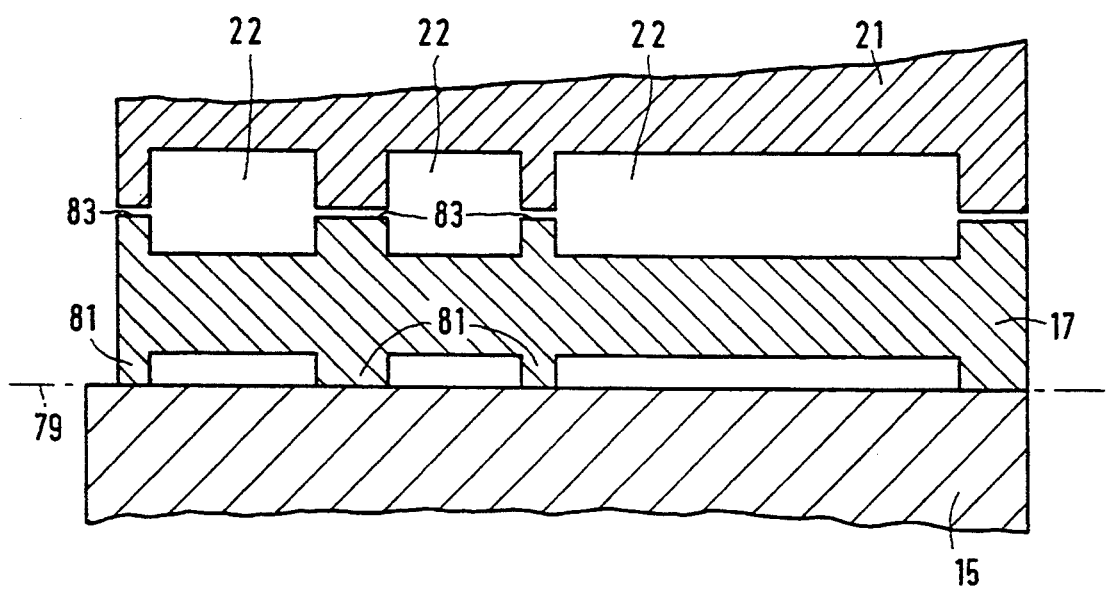
FIG. 6 shows a first and a second mold part according to an embodiment of the invention.

FIG. 6 shows the first mold part 17 which is provided with ribs 81 at a side 79 remote from the second mold part 21, which ribs are situated opposite faces 83 of the first mold part 17 which can be pressed against the second mold part 21. The pressure force supplied by the hydraulic system 27 of the press 2 is transmitted to the ribs 81 by the first support block 15, the ribs passing the force on to the faces 83. The use of the mold part 17 depicted in FIG. 6 in combination with the tilting possibility of the mold part described above results in a very good compression of the first mold part 17 against the second mold part 21, so that no plastic mold material can enter between the surfaces of the two mold parts pressed together. It is possible to construct the first mold part 17 in mirror-symmetrical form, so that in case of wear of the side facing the second mold part, the first mold part 17 may be turned and the side 79 will face the second mold part 21. For the sake of clarity, the mold parts 17, 21 are drawn in a position in which the mold parts 17, 21 do not lie against one another.

The mechanical drive may be realized by means of any known mechanism. As an alternative to the threaded spindle and the nut, for example, a linear motor may be used. The drive pins 29 may also have their bearings in a slide which is movable transverse to the central axis.

What is claimed is:

1. A method of closing a mold comprising:

displacing a first mold part toward, but not in contact with, a second mold part via a non-fluid mechanical drive in a first primary displacement range parallel to a central axis;

after the displacing, bringing into contact and pressing the first mold part against the second mold part in an adjoining second displacement range in a secondary displacement parallel to said axis via a pressurized fluid to form a mold cavity; and, during said pressing at least partly filling the cavity with a solidifiable moldable liquid;

the bringing into contact and pressing of the first mold part being carried out purely by said pressurized fluid via actuators and at constant pressure, said pressing including, after the primary displacement of the first mold part, moving the actuators from an idle position to an operational position in which the mold parts are kept pressed against one another by the actuators after the secondary displacement has been completed by the actuators.

2. A method of molding comprising:

displacing a first mold part toward, but not in contact with, a second mold part via a mechanical non-fluid operated drive in a first primary displacement range parallel to a central axis;

after the displacing, bringing into contact and pressing the first mold part against the second mold part in an adjoining second displacement range in a secondary displacement parallel to said axis via a pressurized fluid at constant pressure to form a mold cavity; and filling the cavity with a solidifiable moldable liquid during said pressing.

3. The method of claim 2 wherein the pressing step includes pneumatically operating hydraulic means and causing the hydraulical means in response to the pneumatically operating to perform said pressing.

* * * * *